United States Patent
Rupp et al.

(10) Patent No.: US 6,832,343 B2
(45) Date of Patent: Dec. 14, 2004

(54) APPARATUS FOR CONTROLLING SAFETY-CRITICAL PROCESSES

(75) Inventors: Roland Rupp, Hattenhofen (DE); Klaus Wohnhaas, Fellbach (DE); Hans Schwenkel, Stuttgart (DE)

(73) Assignee: Pilz GmbH & Co., Ostfildern (DE)

( * ) Notice: Subject to any disclaimer, the term of this patent is extended or adjusted under 35 U.S.C. 154(b) by 478 days.

(21) Appl. No.: 10/072,558

(22) Filed: Feb. 8, 2002

(65) Prior Publication Data

US 2002/0093951 A1 Jul. 18, 2002

Related U.S. Application Data

(63) Continuation of application No. PCT/EP00/06483, filed on Jul. 7, 2000.

(30) Foreign Application Priority Data

Aug. 20, 1999 (DE) .......................................... 199 39 567

(51) Int. Cl.[7] ........................ G06F 11/00; G05B 19/048
(52) U.S. Cl. ............................ 714/47; 714/44; 714/48; 710/100; 700/21
(58) Field of Search ............................ 714/25, 43, 44, 714/47, 48; 700/21, 40, 80; 710/100; 709/243; 702/35

(56) References Cited

U.S. PATENT DOCUMENTS

| | | | | |
|---|---|---|---|---|
| 5,796,721 A | * | 8/1998 | Gretta, Jr. ................... | 370/245 |
| 6,298,454 B1 | * | 10/2001 | Schleiss et al. ............... | 714/37 |
| 6,347,252 B1 | * | 2/2002 | Behr et al. ...................... | 700/3 |
| 6,631,476 B1 | * | 10/2003 | Vandesteeg et al. ............ | 714/4 |
| 2001/0013826 A1 | * | 8/2001 | Ahmed et al. ............... | 340/439 |

FOREIGN PATENT DOCUMENTS

| | | |
|---|---|---|
| DE | 42 25 834 A1 | 2/1994 |
| DE | 0 698 837 A1 | 2/1996 |
| DE | 44 33 013 A1 | 3/1996 |
| DE | 195 29 430 A1 | 1/1997 |
| DE | 195 28 437 A1 | 2/1997 |
| DE | 197 42 716 A1 | 4/1999 |

OTHER PUBLICATIONS

Callen, Jeffrey N., et al. "A Distributed Control System for Vehicles," Jun. 27, 1996.
Farsi, Mohammad, et al. "An Introduction to CANopen and CANopen Communication Issues," IEE CANopen Implementation Workshop, 10–6–978, pp. 2/1–6.
"Introducing Bus Systems, Today: the CAN Bus" (German article).
"From a Fail–Safe Controller to a Fail–Safe Bus" (German article).

* cited by examiner

Primary Examiner—Scott Baderman
Assistant Examiner—Anne L. Damiano
(74) Attorney, Agent, or Firm—Harness, Dickey & Pierce, P.L.C.

(57) ABSTRACT

The present invention relates to an apparatus for controlling safety-critical processes. The apparatus includes at least one safe control unit for controlling the safety-critical processes and at least two safe signal units which are connected via I/O channels to the safety-critical processes. The safe control unit and the safe signal units are connected to a common fieldbus. The safe signal units communicate with the safe control unit, but not with one another, when the apparatus is in the control mode. The safe signal units have an evaluator for evaluating a fault message which is broadcasted across the fieldbus, as well as a switching device which autonomously change the safety-critical process to a safe state when a fault message which is evaluated as being relevant occurs.

16 Claims, 3 Drawing Sheets

APPARATUS FOR CONTROLLING SAFETY-CRITICAL PROCESSES

CROSS-REFERENCES TO RELATED APPLICATIONS

This application is a continuation of copending international patent application PCT/EP00/06483 filed on Jul. 7, 2000 and designating the U.S., which claims priority of German patent application DE 199 39 567.5 filed on Aug. 20, 1999.

BACKGROUND OF THE INVENTION

The present invention relates to an apparatus for controlling safety-critical processes, in particular an apparatus having a safe control unit for controlling the safety-critical processes and having at least two safe signal units which are connected via I/O channels to the safety critical processes, with the safe control unit and the safe signal units being connected to a common fieldbus, and with the safe signal units communicating with the safe control unit, but not with one another, when the apparatus is in the control mode.

A fieldbus is a system for data communication, in which the connected units are connected to one another via a common bus-line. Two units which are connected to the fieldbus can thus communicate with one another without needing to be directly wired up to one another individually. Examples of known fieldbuses include the so-called CAN bus, the so-called Profibus and the so-called Interbus.

The use of fieldbuses has already been sufficiently well known for a long time in the field of control and automation. However, this is not true for the control of safety-critical processes in which, in practice, the units involved in the control system have been individually wired up to one another until the very recent past. This is because it was not possible for the known fieldbuses to ensure the fault protection (fault probability of less than $10^{-11}$) required for controlling safety-critical processes. All known fieldbuses admittedly have measures for fault protection during data transmission, but these measures are not sufficient to ensure the required fault protection. In addition, fieldbuses are open systems to which, in principle, any desired units can be connected. There is a risk in this case of a unit which has nothing whatsoever to do with a safety-critical process that is to be controlled influencing said process in an undesirable manner.

In this context, the term "safety-critical process" means a process which results in an unacceptable risk to people or material goods if a fault occurs. Thus, ideally, a safety-critical process must provide a 100% guarantee that the process will be changed to a safe state if a fault occurs. In the case of a machine system, this may include the system being switched off. In the case of a chemical production process, switching off may, however, lead to an uncontrolled reaction so that, in a case such as this, it is better to change the process to a non-critical parameter range.

Safety-critical processes may also be process elements of larger, higher-level overall processes. By way of example, in the case of a hydraulic press, the material supply may be a non-safety-critical process element, while, an the other hand, the starting up of the pressing tool is a safety-critical process element. Further examples of safety-critical processes (or process elements) are the monitoring of safety guards, protection doors or light barriers, the control of two-hand operated switches, or the monitoring and evaluation of an emergency-off switch.

The units which are involved in the control of a safety-critical process must have safety-related devices going beyond their actual function. These are used primarily for fault and functional monitoring. Units such as these generally have a redundant design, in order to guarantee that they operate safely even when a fault occurs. Units with safety-related measures such as these are referred to in the following text as safe, in contrast to "normal" units.

For the purposes of the present invention, units which have a certain amount of intelligence for controlling a process are referred to as control units. Control units such as these are frequently referred to as clients, in the specialist terminology.

These receive data and/or signals which represent state variables of the controlled processes and activate actuators, which influence the process to be controlled, as a function of this information. The intelligence is normally stored in a memory in the control units, in the form of a variable user programs. Programmable logic controls (PLC) are generally used as the control units.

In contrast, a signal unit is a module which essentially provides input and output channels (I/O channels) to which, firstly, sensors for recording process variables and, secondly, actuators can be connected. A signal unit has no intelligence in the form of a variable user programs, and it thus does not have the capability, either, to autonomously control a machine or a process. Moreover, an emergency switch-off may be carried out autonomously when a fault occurs. A signal unit is provided, per se, only to locally carry out a command received from a physically remote control unit. To do this, the signal unit may have a programs in the form of an operating system. However, the user cannot vary this programs without modifying the hardware of the signal unit. Signal units are normally referred to as servers in the specialist technology.

DE-A-197 42 716 describes an apparatus for controlling safety-critical processes, such as the monitoring of a safety guard. The known apparatus has a control unit and, for example, three signal units, which are connected to one another via a fieldbus. Both the control unit and the signal units have safety-related devices for carrying out predetermined safety functions. In an entirely general form, these are thus safe units for the purposes of the present invention.

In the known apparatus, the process to be controlled is changed to a safe state when a fault occurs. The switching signal which is used to initiate this action can be triggered firstly by the higher-level control unit or secondly in the area of that signal unit in which the fault has occurred.

However, with the known apparatus, it is impossible for a first signal unit in whose area the fault has occurred to cause other signal units which are connected to that fieldbus likewise to switch off the associated processes there, or to change these processes to a safe state. If a number of processes which are actuated via different signal units need to be changed to a safe state, it is necessary to transmit an appropriate individual control command to each of the signal units which are affected. This is because the known signal units have no intelligence which would make it possible for them to control other signal units.

The known apparatuses thus have the disadvantage that valuable time may be lost, when a fault occurs in the area of a signal unit, before safety-critical processes which are associated with other signal units can be changed to a safe state. In detail, a data interchange is in this case first of all required between the first signal unit and the higher-level control unit, followed by a further data interchange between the higher-level control unit and the further signal units which are affected. There is thus a risk with the known apparatuses of a process which is only indirectly affected by a fault not being switched off sufficiently quickly.

It is known from DE-A-197 42 716 that an entire system having a large number of process elements can be completely switched off by a single signal unit. In this case, the corresponding signal unit is used as a central switch, in particular interrupting the main power supply. In this case, although the entire system can be switched off quickly if a fault occurs, it is then impossible, however, to exclude individual process elements from this, as a function of the situation.

Until now, the apparatuses of this generic type have in each case had only one control unit. This means that the apparatus is no longer available at all when the control unit fails. However, it is desirable to be able to continue to operate an apparatus of this generic type in a flexible way even in a case such as this.

Furthermore, fieldbus systems are subject to the problem that only one unit which is connected to the fieldbus can ever transmit at one time. Collisions may thus occur when two or more units wish to transmit at the same time. In known fieldbus systems, collisions such as these are avoided by allocating priorities. In detail, however, it is possible when collisions occur for a unit with a low priority to be blocked for a very long time, that is to say, not to be given any transmission window.

In non-safe fieldbus systems, this problem is solved by defining a maximum permissible busload of, for example, 50%. The busload is in this case the quotient of the time in which the fieldbus is being used and the time in which the fieldbus is freely available. If, for example, the busload is below the defined limit, it can be assumed that, statistically an average, the connected units have sufficient access to the fieldbus.

However, when controlling a safety-critical process, a solution such as this is inadequate, since, in individual situations, and in contrast to the statistical average, it is possible for the corresponding unit to be blocked for an unacceptably long time.

SUMMARY OF THE INVENTION

It is an object of the present invention to specify an apparatus of the type initially mentioned, by means of which, when a fault occurs in the area of a signal unit, any desired combinations of process elements within an entire system can be changed to a safe state as quickly as possible.

For the inventive apparatus, a key feature to achieve this object is that the safe signal units have an evaluator for evaluating a fault message which is broadcasted in general form via the fieldbus, as well as a switching device which autonomously changes the safety-critical process to a safe state when a fault message which is evaluated as being relevant occurs.

In contrast to the already known apparatuses, the signal units in the present invention have the capability to react autonomously to a fault message which is transmitted in general form via the fieldbus, that is to say, a fault message which is not directed specifically to them.

An autonomous reaction by the signal units means that they can react even without a control command directed specifically to them from the higher-level control unit. In plain words, the signal units in the present invention thus have a certain amount of intelligence, which is stored within their operating system and/or their hardware.

The apparatus according to the invention has the advantage that, by virtue of the intelligence that they have been given, the individual signal units are able to autonomously evaluate a generally transmitted fault message. Thus, independently of the higher-level control unit, they can react to a fault which has occurred in a different area of the overall apparatus. Accordingly, there is no longer any need for each individual signal unit to receive a specific control command to switch off the safety-critical processes associated with it. This measure means that it is possible when a fault occurs to switch off any desired combinations of process elements at the same time by means of a single fault message. This is considerably faster than if each of the relevant signal units had to be addressed specifically by the higher-level control unit.

In one refinement of the invention, each of the signal units has transmission means for sending a fault message to a large number of signal units.

This measure has the advantage that each of the signal units is able, when a fault occurs in their area, to directly inform the other signal units connected to that fieldbus. Since each of the signal units is furthermore able to react autonomously to the reception of a fault message, it is thus possible in this way to change safety-critical process elements which are affected by the fault to a safe state particularly quickly. The particular advantage of this measure is that a higher-level control unit is in this case no longer involved at all in the communication with the signal units, that is to say the signal units communicate directly with one another without the indirect route via the control unit. This results in a considerable amount of time being saved.

In a further refinement of the invention, the signal units which are connected to the fieldbus are each allocated to at least one defined group of signal units, with the evaluator of each signal unit evaluating the fault message for its relevance to the respectively associated group.

This measure has the advantage that the individual signal units can very quickly find out whether a fault which has occurred in the area of another signal unit has any relevance to its own safety-critical processes. In consequence, each of the signal units which are affected can react particularly quickly to a fault message sent in general form.

In a further refinement of the measure mentioned above, the groups affected by the fault are coded in each fault message.

This measure has the advantage that each of the signal units can itself identify the relevance of the fault message directly from the fault message itself. This makes it possible to react even more quickly to the occurrence of a relevant fault.

In a further refinement of the invention, fault messages within the bus protocol have the highest transmission priority, irrespective of the priority of their sender.

In this refinement of the invention, it is possible, independently of the busload, for a signal unit to send a fault message immediately after identification of that fault. This is true even if that signal unit has only a relatively low transmission priority within the structure of the fieldbus. In plain words, each subscriber which is connected to the fieldbus is in this case provided with the capability to send a message with the highest possible priority. It is thus possible to inform other units which are connected to the field bus particularly quickly of the occurrence of a fault, even in a lower-level area of the system. In consequence, it is possible to react very quickly even to apparently "minor" faults. Furthermore, each unit is in this way provided with the capability to demand bus access even when the busload is very high, and irrespective of its priority.

In a further refinement of the invention, the evaluator. of each signal unit evaluate a fault message without sending an acknowledgment message.

This measure represents a special feature in comparison to known apparatuses, since, when controlling safety-critical processes, each message which is sent is first of all normally acknowledged via an acknowledgment message, which is sent back from the receiving unit to the transmitting unit. The transmitting unit normally reacts to the absence of an acknowledgment message by using suitable measures to interrupt the data processing in the receiving unit. In contrast, the said measure has the advantage that a signal unit can directly process a fault message that has been received, without any time delay, since in this case, exceptionally, no acknowledgment message is required. This measure makes it possible to further speed up the reaction to the occurrence of a fault.

In a further refinement of the invention, each signal unit has a time monitor, which initiates the sending of a fault message in the absence of an expected event.

This measure has the advantage that it provides a high level of redundancy within the overall apparatus, since each signal unit which is connected to the fieldbus monitors that the specified time sequences are complied with. The said measure thus contributes to improving the safety within the overall apparatus, since the mutual monitoring is shared "over numerous shoulders".

In a further refinement of the measure mentioned above, the expected event is the reception of an acknowledgment message.

This measure has the advantage that each of the units which are connected to the fieldbus automatically carries out a fault check of the addressed units when a message is sent. This results in continuous mutual monitoring, virtually without any gaps.

In a further refinement of the measures mentioned above, the expected event is the reception of a test message which is sent cyclically.

The test message is a message which is sent from one unit, for example a higher-level control unit, to other units which are connected to the fieldbus. Since, as already explained, a message such as this must be acknowledged by an acknowledgment message, this provides the higher-level unit with the capability to check that the connection to the addressed units is fault-free. Conversely, the higher-level unit is monitored, since each signal unit monitors the regular, cyclical receipt of the test messages.

In a further refinement of the measures mentioned above, but which is itself likewise regarded as an invention, the expected event is a transmission window.

As already mentioned, the communication of the individual connected units in a large number of fieldbus systems is co-ordinated by the specific allocation of transmission authorization or by providing specific transmission windows (for example in the case of Frofibus). In other fieldbus systems, the individual units are provided with their transmission authorization on the basis of a fixed priority allocated to them. In both cases, it is possible for a unit to have to wait for an unacceptably long time for the transmission window, owing to a high load. This may be dangerous when controlling safety-critical processes, since each unit is inhibited from communicating for a correspondingly long time. However, the said measure makes it possible for the affected unit to communicate even with bus subscribers which have a higher priority, specifically by generating a fault message with a correspondingly high or the highest priority. This measure has the advantage that the fieldbus can be operated with a very high busload even when controlling safety-critical processes, since it is always possible in this case for any unit to circumvent unacceptably long blocking. Even if the busload is very high, this ensures that messages are always transmitted via the fieldbus within a fixed defined maximum time interval. This measure is also of particular advantage in its own right, by virtue of this fact.

In a further refinement of the invention, the fieldbus is a CAN bus.

This measure is particularly advantageous, since, by virtue of its basic structure, a CAN bus allows the transmission and reception of messages between any units which are connected to the bus. In consequence, a CAN bus is particularly highly suitable for very quickly sending a fault message to a large number of connected units when a fault occurs in a specific area. At the same time, however, owing to this characteristic, a CAN bus requires very strictly defined rules relating to communication co-ordination to be complied with when controlling safety-critical processes. The measures according to the invention are particularly advantageous in conjunction with a CAN bus, since, firstly, they include clear rules relating to communication co-ordination and, secondly, they make optimum use of the special feature of the CAN bus. Overall, a CAN bus in combination with the measures according to the invention is thus particularly highly suitable for controlling safety-critical processes.

In a further refinement, but which is also advantageous in its own right, the apparatus has at least two safe control units for controlling safety-critical processes, and these are connected to at least one signal unit via a common fieldbus.

This measure has the advantage that the apparatus can then still be used to control processes even when one of the control units has failed. For example, this makes it possible to control two identical machine systems separately from one another via one common fieldbus. If one of the machine systems fails, the other can continue to operate and, in some circumstances, can even increase production in order to compensate for the loss of the first machine system.

In a further refinement of the measure mentioned above, the apparatus also has an administration unit for coordinating the at least two safe control units.

This measure has the advantage that the co-ordination of a number of control units can be carried out by them separately, so that the control units are themselves completely available for controlling the processes, that is to say, for carrying out the application programs. Furthermore, the co-ordination of the control units, which in turn has to take account of safety aspects relating to the apparatus, is taken away from user access.

In one further refinement, the at least two safe control units have at least one signal unit associated jointly with them, with a first of the safe control units communicating directly with the said signal unit, while a second of the safe control unit communicates with the said signal unit via the first control unit.

This measure has the advantage that individual resources within the apparatus, for example an emergency-off switch, can be used jointly by the number of control units. This allows costs to be saved, and increases the overall flexibility. In this case, the said measure makes it possible to avoid collisions when accessing the jointly used signal unit.

It is self-evident that the features mentioned above and which will also be explained in the following text can be used not only in the respectively stated combination but also

BRIEF DESCRIPTION OF THE DRAWINGS

Exemplary embodiments of the invention will be explained in more detail in the following description, and are illustrated in the drawing, in which.

DETAILED DESCRIPTION OF PREFERRED EMBODIMENTS

Figure 1:
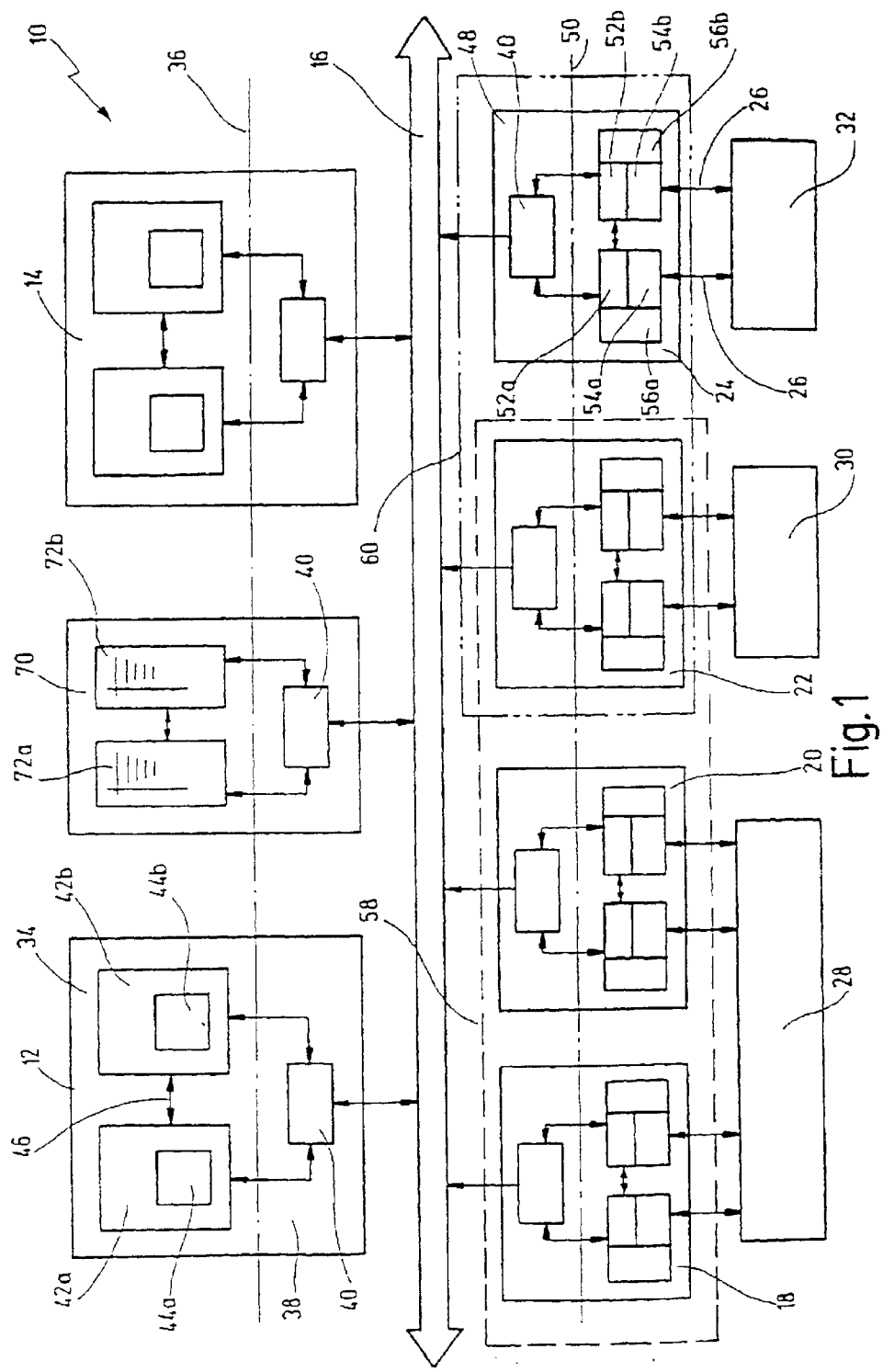
FIG. 1 shows an exemplary embodiment of the invention, in which two safe control units are connected via a fieldbus to a total of four safe signal units.

In FIG. 1 an apparatus according to the invention is denoted overall by the reference number 10.

The apparatus 10 has two safe control units 12 and 14, which are connected via a fieldbus 16 to a total of four safe signal units 18, 20, 22 and 24. Each of the safe signal units 18 to 24 has a number of I/O channels, via which it is connected to a respective safety-critical process 28, 30, 32. In this case, the safe signal units 18 and 20 are connected to the process 28, while the signal unit 22 is connected to the process 30, and the signal unit 24 is connected to the process 32. The safety-critical process 28 is, for example, a two-hand control for a machine system, in which the rotation speed of a machine shaft (not shown here) is also monitored. The safety-critical process 30 is, for example, the monitoring of an emergency-off switch, and the safety-critical process 32 is the monitoring of a safety-guard (likewise not shown).

The signal units 18 to 24 use their I/O channels 26 firstly to read signals and/or data values relating to the safety-critical processes 28 to 32. Signals and data values such as these are, for example, the current rotation speed of the machine shaft, or the switch position of the emergency-off switch. Secondly, the signal units 18 to 24 can use their I/O channels 26 to act an actuators, by means of which the safety-critical processes 28 to 32 are influenced. Thus, for example, the safety-critical process in which the switch position of the emergency-off switch is monitored has an actuator (not shown), by means of which the main power supply of the controlled and monitored machine system can be switched off.

The safe control units 12 and 14 are each fundamentally designed in the same way, as are the safe signal units 18 to 24. For this reason, the following reference symbols for explaining the control units 12, 14 and the signal units 18 to 24 in FIG. 1 will each be mentioned only once.

The control units 12, 14 each contain a safe processing section 34 which, in FIG. 1, is arranged above the dashed-dotted line 36. In this schematic illustration, a non-safe section 38, which essentially contains a module 40 referred to as a bus controller, is located underneath the line 36. The bus controller 40 is a standard module, in which the standard protocol of the fieldbus 16 is implemented. The bus controller 40 is able to autonomously handle the actual transmission and reception of messages. It receives the messages to be sent from the safe processing section 34. Conversely, it makes the received messages available to the safe processing section 34.

According to one preferred embodiment of the invention, the fieldbus 16 is a CAN bus. With this bus, the messages to be sent are transmitted within a payload field, which has additional control information added to it for its route via the fieldbus 16. The entire packet of control information and the payload field forms the message. The bus controller 40 is able to autonomously embed messages, which it receives from the safe processing section 34, in the specified form in the messages to be sent. Conversely, it can extract the messages contained in the payload field from the received message.

The safe processing section 34 of each control unit 12, 14 is designed to have two channels. Each of the two channels essentially contains a processor 42a, 42b with a respectively associated peripheral, by means of which an application programs 44a, 44b is run. The control for the machine system and hence the intelligence of the control units 12, 14 resides in the application programs 44a, 44b.

The two processors 42a, 42b carry out safety-relevant tasks redundantly with respect to one another. In the process, they monitor one another, as is illustrated by an arrow 46 in FIG. 1. The safety-relevant tasks include, for example, measures to protect against errors in messages which are transmitted or sent. These measures are carried out in addition to the error protection measures which are already carried out as standard by the bus controller 40. It is thus possible to considerably reduce the error probability in comparison to the non-safe fieldbus 16.

The signal units 18 to 24 are connected to the fieldbus 16 via the same bus controller 40 in the same way as the control units 12, 14. Accordingly, the section 48 above the line 50 in FIG. 1 is once again non-safe for the purposes of the present invention. In the safe processing section below the line 50, each signal unit 18 to 24 is once again designed with two-channel redundancy. The two redundant processing channels are once again able to carry out mutual fault monitoring.

Each of the processing channels of the signal units 18 to 24 has a processing unit 52a, 52b as well as a switching device 54a, 54b. The processing units 52a, 52b both contain an evaluator, by using which the signal units 18 to 24 can evaluate received messages, and a transmitter, using which, and in combination with the bus controller 40, they can send messages via the fieldbus 16. The processing units 52 each contain a processor for carrying out the intended tasks, but they have no application programs 44 which can be edited by the user of the machine system. The functional scope of the signal units 18 to 24 is thus governed only by the respective manufacturer and is stored as an operating system in so-called firmware.

The switching device 54 make it possible for the signal units 18 to 24 to activate the actuators, which are not illustrated here, in order to influence the safety-critical processes 28 to 32. The switching device 54a, 54b are thus able to change the safety-critical processes 28 to 32 to a safe state. In the assumed situation, in which the apparatus 10 is being used to control a complex machine system, the safety-critical processes 28 to 32 are, for example, changed to their safe state by switching of parts of the machine system, or the entire machine system.

Reference numbers 56a, 56b each denote time monitors which, within the signal units 18 to 24, check whether specified time sequences are being complied with. If, for example, an expected message is not received within a defined time period, the time monitors 56a, 56b generate a fault report, which, in the end, can lead to the machine system being switched off.

According to one preferred embodiment of the invention, the signal units 18 to 24 are allocated to defined groups of signal units. These groups are in turn allocated to the two control units 12 and 14. By way of example, the first group 58 is indicated in FIG. 1 by means of a dashed line, with which the signal units 18, 20 and 22 are associated. The reference number 60 denotes a second group, with which the signal units 22 and 24 are associated. This means that individual signal units can also be allocated to a number of groups 58, 60 at the same time, as is shown with regard to the signal unit 22.

The allocation of individual signal units 18 to 24 to groups 58, 60 makes it possible to switch off the safety-critical processes 28 to 32 in groups when a fault occurs within the apparatus 10. One example of the allocation of signal units 18 to 24 to groups 58, 60 is for two machine systems, which are separate from one another, to be controlled at the same time by the apparatus 10, in particular by the two control units 12, 14. In the situation where a fault that has occurred affects only one of the two machine systems, it is also sufficient to switch off only this machine system. The joint control of the two machine systems by means of the apparatus 10 in a case such as this makes it possible to increase the production rate of the second machine system, in order to compensate for the shutdown of the first machine system. The allocation of the signal units 18 to 24 to the groups 58, 60 allows any desired combinations of safety-critical processes 28 to 32 to be changed to the safe state specifically and by means of a single control command.

The reference number 70 in FIG. 1 denotes a so-called administration unit, which is also referred to as a "Management Device". The administration unit 70 is likewise connected to the fieldbus 16 via a bus controller 40. It can thus communicate with the other units that are connected to the fieldbus 16.

However, the administration unit is not directly involved in the communication between the control units 12, 14 and the signal units 18 to 24.

In its safe processing section, the administration unit 70 essentially has two mutually redundant memories 72a, 72b, in which the overall configuration of the apparatus 10, in particular the structure of the units which are connected to the fieldbus 16, is stored. The administration unit 70 carries out a central administration and monitoring function, in order primarily to co-ordinate the various control units 12, 16 with respect to one another. This means that it is possible to operate different control units 12, 14 on one fieldbus 16.

Furthermore, in the present exemplary embodiment, one task of the administration unit 70 is to initiate a connection test at regular time intervals. In this case, the administration unit 70 sends a test message to the control units 12, 14 in order to check whether the connection to these control units is still operating satisfactorily. Control units 12, 14 themselves react to this test message by sending test messages to the signal units 18 to 24 associated with them, in order to check these communications connections as well. The administration unit 70 monitors all the data traffic relating to this, and thus, at regular time intervals, receives information as to whether all the known units are still actively connected to the fieldbus 16, as before. In the absence of an expected test message, or else in the absence of an expected response message to a test message which has been sent, the ad-ministration unit and/or the relevant control or signal unit generates a fault message, on the basis of which the safety-critical processes 28 to 32 are changed to their safe state.

As an alternative to the exemplary embodiment described here, the administration unit 70 may also be integrated in one of the control units 12, 14. In this situation, the administration unit 70 represents a functional block within the control unit 12, 14, which then distinguishes the relevant control unit from the other control units which are connected to the fieldbus 16.

The use of the administration unit 70 is particularly advantageous when, as in the present situation, the fieldbus 16 is a CAN bus. This is because, in this situation, there is normally no central unit to carry out the communication co-ordination on the fieldbus. On the contrary, the units which are connected to the fieldbus 16 at least in principle have equal priority. In the case of a standard CAN bus, there is thus no unit which has an overview of the changes in the structure of the units which are connected to the fieldbus 16. The failure of one unit which, when controlling safety-critical processors 28 to 32, can in some circumstances cause a dangerous state, is thus not detected with sufficient confidence. This safety loophole in the case of CAN bus can be closed by using the administration unit 70.

In the exemplary embodiment described here, the access by the various control units 12, 14 to a jointly used single unit, that is to say, in this case by way of example, the signal unit 22, is coordinated in that one control unit, in this case for example the control unit 12, is given a "master" function. This function allows the control unit 12 to communicate directly with the jointly used signal unit 22. The other "slave" control units, that is to say, in this case, the control unit 14, is granted access to the jointly used signal unit 22 only under the control of the master control unit 12. In the present situation, the control unit 14 first of all sends a message, which is intended for the jointly used signal unit 22, to the master control unit 12. The latter then passes this message on to the jointly used signal unit 22. On the other hand, the signal unit 24, which is associated only with the control unit 14 in the present exemplary embodiment, is addressed directly by the control unit 14. From the point of view of the jointly used signal unit 22, the control unit 14 appears to be subordinate to the control unit 12 within the structure of the fieldbus 16. It is addressed by the control unit 12 in the same way as the signal units 18 to 24. From the point of view of the signal unit 24, which is used solely by it, the control unit 14 itself has the master function, however.

The communication between the two control units 12 and 14 can take place in the same way as the communication between each of these two control units and the signal units 18 to 24.

The allocation of the individual signal units 18 to 24 to the various control units 12, 14 is stored in the administration unit 70 in the same way as the allocation of the signal units to the groups 58, 60.

Figure 2:
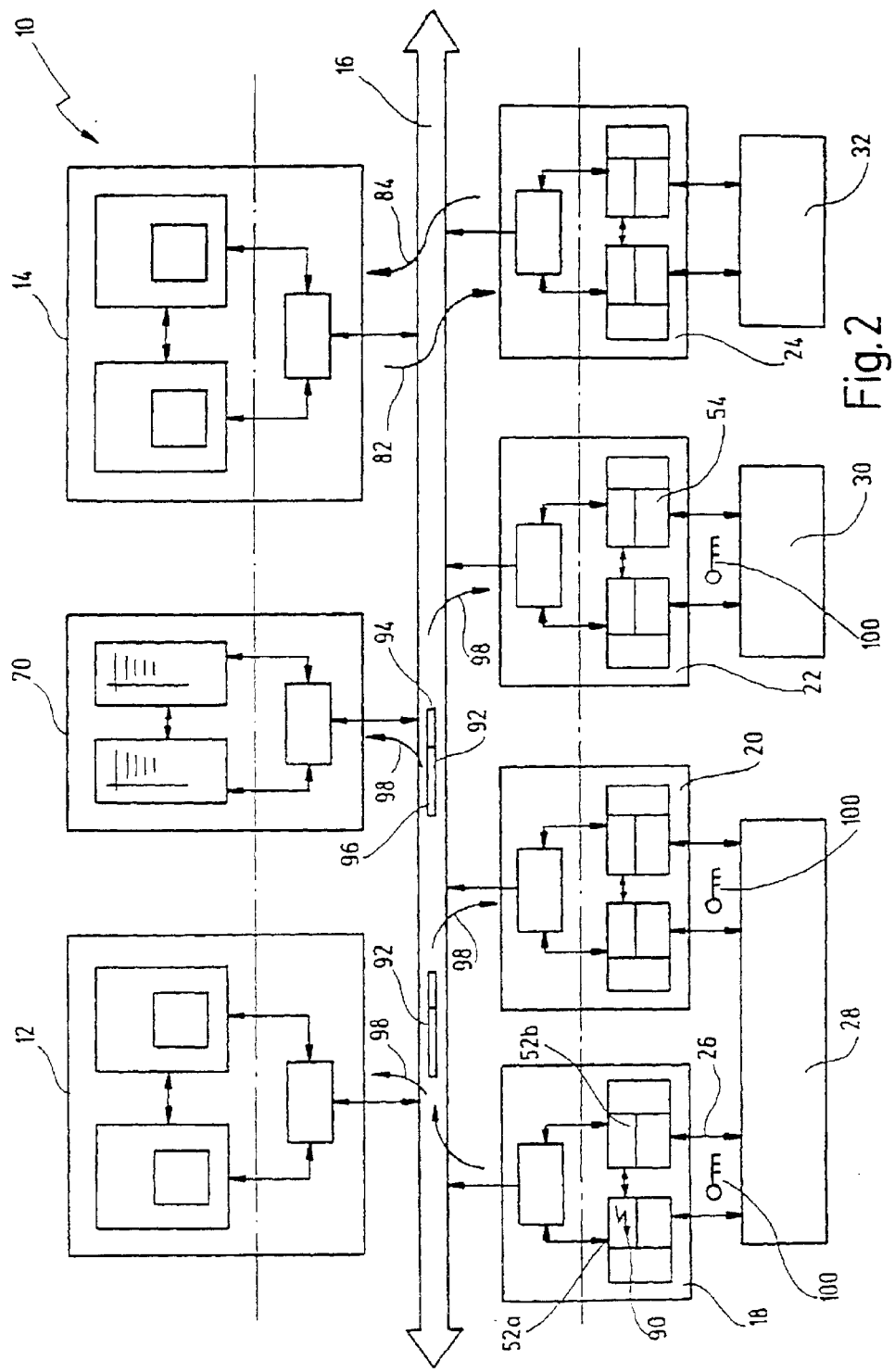
FIG. 2 shows various data traffic via the fieldbus.

FIG. 2 first of all shows the normal data traffic via the fieldbus 16 in the normal control mode of the apparatus 10, based an the control unit 14 and the signal unit 24. In the normal control mode, the same data traffic also takes place between the control unit 12 and the signal units 18 to 22 associated with it.

The control unit 14 sends a control command to the signal unit 24 in the form of a message in the direction of the arrow 82. The signal unit 24 receives the message 82 and responds with an acknowledgment message, which is sent back in the direction of the arrow 84 to the control unit 14. The processing unit 52 in the signal unit 24 then evaluates the received control command, and carries out the intended action.

By way of example, the action may comprise the signal unit 24 reading a signal or data value relating to the safety-critical process 32, and transmitting it to the control unit 14. This is done by means of a message in the direction of the arrow 82, to which the control unit 14 responds with an acknowledgment message in the direction of the arrow 82.

When the apparatus 10 is in the normal control mode, the signal unit 24, like the signal units 18 to 22, is only an implementing unit, which does not itself originate any autonomous actions. In particular, when the apparatus is in the normal control mode, none of the signal units 18 to 24 communicates with any other signal units 18 to 24, since such communication is necessarily dependent an autonomous activity.

However, in contrast to this normal control mode, each of the signal units 18 to 24 is able, by virtue of the invention, to transmit a fault message generally via the fieldbus 16 to the other signal units. In the same way, each of the signal units 18 to 24 is able to evaluate a generally transmitted fault message, and to react to it autonomously. This is illustrated on the basis of the example of the signal unit 18 in FIG. 2.

In this example, a fault, which is indicated by a lightning flash 90, has occurred in the processing unit 52a of the signal unit 18. The processing unit 52b confirms this fault on the basis of the mutual check of the processing units 52a, 52b. Since this fault could be dangerous with regard to the safety-critical process 28 to be controlled, the signal unit 18 generates a fault message 92, and sends this generally via the fieldbus 16. The fault message 92 has a general first part 94, which identifies it as a general fault message. A message which has this general section automatically has the highest possible priority within the structure of the apparatus 10 and, if necessary, interrupts any data traffic via the fieldbus 16 between connected units.

The groups 58, 60 of signal units 18 to 24 which are affected by the fault 90 are coded in the second part 96 of the fault message 92. The fault message 92 is received and evaluated by all the units which are connected to the fieldbus 16, as is represented by the arrow 98. In particular, the fault message 92 is in this case received and evaluated by the signal units 20, 22 and 24 (the latter of which is not illustrated here). In contrast to the normal control mode of the apparatus 10, communication thus in this case takes place directly between the signal units 18 and 20 to 24.

The processing units 52 and the individual signal units 20 to 24 are able to identify the fault message 92 as such, and to evaluate it using the coded groups in the second section 96. In a situation where a group 58, 60 is coded in the second section 96 of the fault message 92, to which group a receiving signal unit 20 to 24 belongs, the corresponding processing unit 52 switches off the safety-critical processes 28, 30 that are associated with it. This is represented by the key 100 in FIG. 2. In the situation illustrated in FIG. 2, all the signal units which belong to the first group 58, for example, react.

Figure 3:
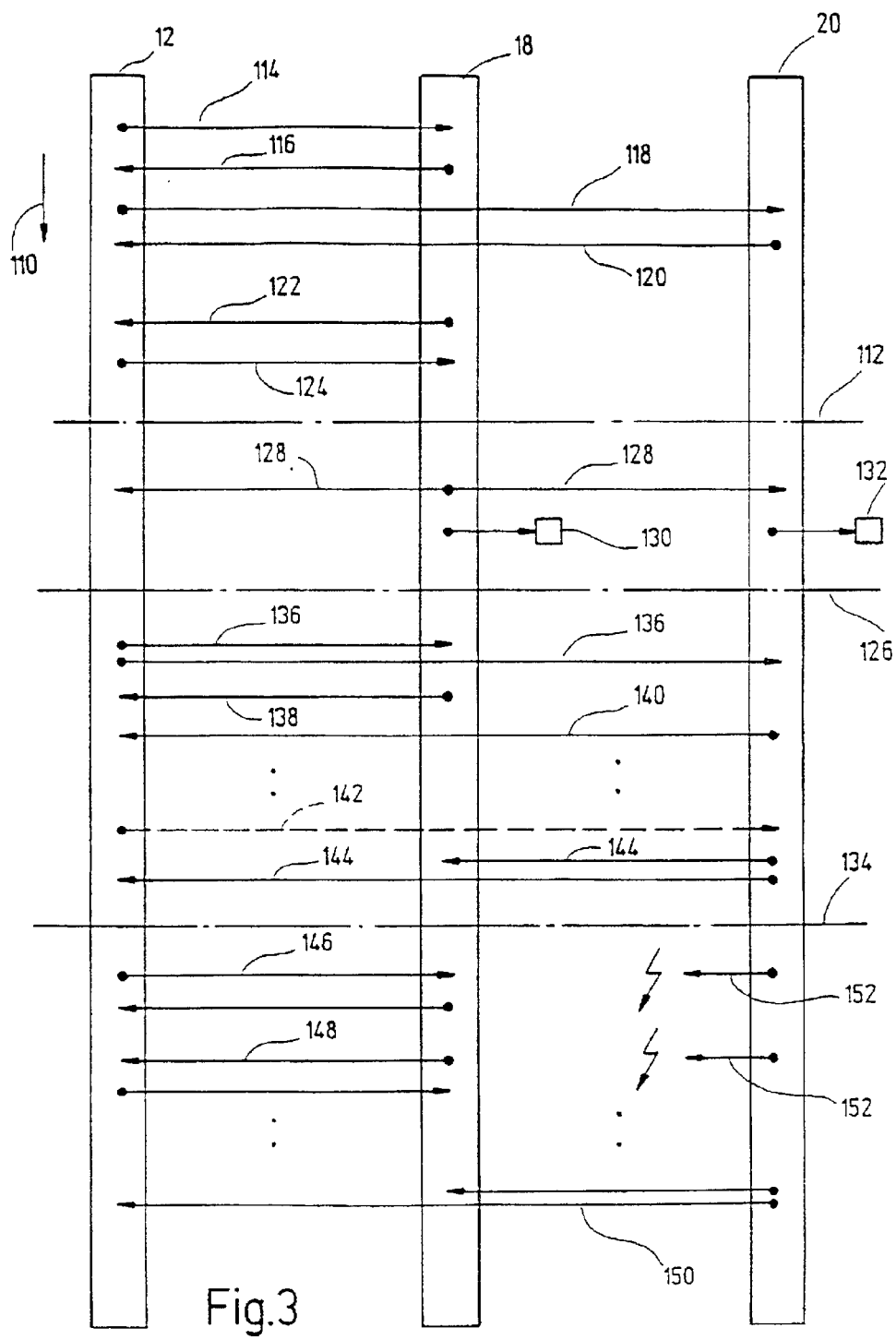
FIG. 3 shows a schematic illustration of various communication sequences between a safe control unit and two safe signal units.

By way of example, the schematic illustration in FIG. 3 shows the time sequence for communication between the control unit 12 and the signal units 18 and 20. In this case, the time axis runs in the direction of the arrow 110.

The individual messages which are sent between the various units are symbolized by arrows, whose point of origin in the transmitter is identified by a dot and whose end point points to the receiver.

The first time period above the line 112 represents the communication of the relevant units when the apparatus 10 is in the normal control mode. By way of example, the control unit 12 sends a message 114 with a control command to the signal unit 18. This responds with an acknowledgment message 116. In the next step, the control unit 12 sends a message 118 with a further control command to the signal unit 20. This also responds with an acknowledgment message 120. If the first control command, which was transmitted to the signal unit 18 in the message 114, contained a request to read a data value, the signal unit 18 furthermore responds with a message 122, by means of which it transmits the required data value to the control unit 12. The control unit 12 also acknowledges the message 122 by means of an acknowledgment message 124. In the same way, the signal unit 20 can also send data values to the control unit 12. As can be seen from this illustration, there is no communication between the signal units 18 and 20 when the apparatus 10 is in the normal control mode.

The next time period between the lines 112 and 126 shows the behavior of the apparatus 10 when a fault occurs within the signal unit 18. In this situation, the signal unit 18 sends a general fault message 128 via the fieldbus 16, that is to say each unit which is connected to the fieldbus 16 can receive this fault 128. In particular, the signal unit 18 in this case sends the fault message 128 directly to the signal unit 20. The relevant signal units 18 to 20 then react to the fault that has occurred by changing the processes 130, 132 to their safe state. As can be seen from this illustration, the relevant signal units 18 to 20 react to the fault message 128 that has been received without having to wait to receive an acknowledgment message or to generate the dispatch of an acknowledgment message.

The next time period above the line 134 shows the sequence of a connection test between the units connected to the fieldbus 16. In this case, it is assumed that the connection test is initiated by the control unit 12. In contrast to this, the connection test in other exemplary embodiments is initiated by the administration unit 70.

At the start of the connection test, the control unit 12 sends a test message 136 to the signal units 18, 20, and each of the addressed signal units responds to this test message 136 with an acknowledgment message 138, 140. This connection test is carried out at regular, cyclic time intervals. The time intervals are monitored, with the aid of the test monitors 56, by each of the units which are connected to the fieldbus 16. In the absence of an expected test message, as is represented by the dashed arrow 142, the relevant unit, in the present case the signal unit 20, produces a fault message 144 which is once again sent in general form to all the units which are connected to the fieldbus 16. The units which are connected to the fieldbus 16 then react in the already described manner.

A further fault source is shown in the next time period, below the line 134. In this time period, the signal unit 20 tries to send a message via the fieldbus 16. However, in the process, it collides with the message traffic 146, 148 taking place at the same time between the control unit 12 and the signal unit 18. In a CAN bus, as in many other bus systems, collisions such as these are avoided by allocating priorities. If the signal unit has a low priority for sending its message, however, it is possible that this message may not be sent for a relatively long time period via the fieldbus 16.

As is easy to see, the time period in which the signal unit 20 is in this case blocked is dependent on the load level on the fieldbus 16. In this case, the so-called busload is defined as the quotient of that time in which the fieldbus 16 is being used and the time in which the fieldbus 16 is freely available. In the case of non-safe fieldbuses, the time within which a unit can be blocked, such as the signal unit 20 in the present case, is defined by specifying a maximum permissible busload. If, for example, the busload is less than 50% it can be assumed that the connected units all, statistically on average, are given sufficient access to the fieldbus 16. However, such a definition is inadequate for controlling a safety-critical process since, in an individual situation and in contrast to the statistical average, it is possible for the signal unit 20 to be blocked for an unacceptably long time.

According to the invention, in a case such as this, the signal unit 20 thus produces a fault message 150 which has maximum priority. This ensures that unacceptably long blocking of the signal unit 20 is always ended once a defined time interval has elapsed, which is monitored by the time monitor 56 for the signal unit 20.

In an entirely general form, this measure gives a unit which is connected to the fieldbus 16 but intrinsically has a low priority the capability to demand bus access. It is thus possible to operate the fieldbus 16 with a busload which is considerably greater than 50% even when controlling safety-critical processes.

What is claimed is:

1. An apparatus for controlling safety-critical processes, said apparatus comprising:
    a safe control unit for controlling said safety-critical processes,
    a plurality of safe signal units each of which having I/O channels for connecting said safe signal units to said safety critical processes, and each of said signal units being allocated to at least one defined group of signal units, and
    a fieldbus, wherein said safe control unit and said safe signal units are connected to said fieldbus for communication, and wherein said safe signal units communicate with said safe control unit, but not with one another during faultless control mode,
    wherein each safe signal unit further comprises:
    a transmitter for broadcasting a fault message via said fieldbus, when a fault is detected by said signal unit,
    an evaluator for evaluating any fault message broadcasted by another unit across said fieldbus as to its relevance with respect to the safety critical processes connected, and
    a switching device which autonomously changes, via said I/O channels, said safety-critical processes connected to a safe state when said evaluator evaluates said fault message as being relevant,
    wherein said evaluator evaluates said fault message for its relevance to said group to which said respective signal unit is allocated.

2. The apparatus of claim 1, wherein groups that are affected by a fault are coded in said fault message.

3. An apparatus for controlling safety-critical processes, said apparatus comprising:
    a safe control unit for controlling said safety-critical processes,
    at least two safe signal units having I/O channels which are connected to said safety-critical processes, and
    a fieldbus, said safe control unit and said safe signal units being connected to said fieldbus for communication,
    wherein said safe signal units communicate with said safe control unit, but not with one another, when said apparatus is in a faultless control mode, and
    wherein said safe signal units each comprise an evaluator for evaluating any general fault message broadcasted across said fieldbus, as well as a switching device which autonomously changes at least one of said safety-critical processes to a safe state when a general fault message broadcasted is evaluated as being relevant.

4. The apparatus of claim 3, wherein said signal units each have a transmitter for broadcasting general fault messages across said fieldbus.

5. The apparatus of claim 3, wherein said signal units are each allocated to at least one defined group of signal units, and said evaluator evaluates said general fault message for a relevance with respect to the associated group.

6. The apparatus of claim 5, wherein groups that are affected by a fault are coded in said fault message.

7. The apparatus of claim 3, wherein said fieldbus provides a bus protocol for organizing said communication, said bus protocol assigning different transmission priorities to said signal units, and wherein said general fault messages are always broadcasted with the highest priority, irrespective of the transmission priority assigned to their sender.

8. The apparatus of claim 3, wherein said evaluator evaluates said fault messages without sending an acknowledgment message.

9. The apparatus of claim 3, wherein said signal units further comprise a time monitor for monitoring a timely occurrence of an expected event, said time monitor initiating the broadcast of said fault message when said expected event is not timely detected.

10. The apparatus of claim 9, wherein said expected event is a reception of an acknowledgment message.

11. The apparatus of claim 9, wherein said expected event is a reception of a test message which is sent cyclically.

12. The apparatus of claim 9, wherein said expected event is a transmission window.

13. The apparatus of claim 3, wherein said fieldbus is a CAN bus.

14. The apparatus of claim 3, comprising at least two safe control units for controlling safety-critical processes, said at least two safe control units being connected to a plurality of safe signal units via said common fieldbus.

15. The apparatus of claim 14, further comprising an administration unit for co-ordinating said at least two safe control units.

16. The apparatus of claim 14, wherein at least one signal unit is associated jointly with said at least two safe control units, wherein a first one of said safe control units communicates directly with said signal unit, while a second one of said safe control units communicates with said signal unit via said first control unit.

* * * * *